United States Patent

Hirai et al.

[11] Patent Number: 5,712,552
[45] Date of Patent: Jan. 27, 1998

[54] NO-WIRING ROBOT

[75] Inventors: Junji Hirai; Yoshiji Hiraga; Yasuhiko Kaku; Ichiro Ishibashi, all of Fukuoka, Japan

[73] Assignee: Kabushiki Kaisha Yaskawa Denki, Kitakyushu, Japan

[21] Appl. No.: 619,514

[22] PCT Filed: Sep. 28, 1994

[86] PCT No.: PCT/JP94/01595

§ 371 Date: Mar. 29, 1996

§ 102(e) Date: Mar. 29, 1996

[87] PCT Pub. No.: WO95/09717

PCT Pub. Date: Apr. 13, 1995

[30] Foreign Application Priority Data

Oct. 1, 1993 [JP] Japan .................................. 5-269707

[51] Int. Cl.$^6$ .................. B25J 19/00; B65B 21/02
[52] U.S. Cl. .................. 318/568.1; 318/568.16; 318/568.2; 414/730; 385/59
[58] Field of Search .................. 318/560–696; 901/3, 5, 7, 9, 13, 15, 47, 48, 49; 395/80, 81, 93, 94; 385/59, 89; 250/227.11; 356/152

[56] References Cited

U.S. PATENT DOCUMENTS

| Re. 34,597 | 5/1994 | Akeel | 219/121.78 |
|---|---|---|---|
| 4,676,002 | 6/1987 | Slocum | 33/1 MP |
| 4,766,322 | 8/1988 | Hashimoto | 250/561 |
| 4,808,064 | 2/1989 | Bartholet | 414/730 |
| 4,816,728 | 3/1989 | Kurakake | 318/568 |
| 5,049,797 | 9/1991 | Phillips | 318/568.16 |
| 5,069,524 | 12/1991 | Watanabe et al. | 385/59 |

*Primary Examiner*—Paul Ip
*Attorney, Agent, or Firm*—Oblon, Spivak, McClelland, Maier & Neustadt, P.C.

[57] ABSTRACT

A robot which does not require electric wires (power transmission wires and signal wires) for interconnecting joint shafts is provided. An electrodeless unit for transmitting electric power by way of high-frequency electromagnetic induction and a unit for transmitting signals by way of optical transmission or high-frequency electromagnetic induction are installed in either a reduction gear that is coupled to the shaft of a motor for actuating each of the shafts of the robot or a direct-drive motor. Electric power or signal wires are drawn through a groove or hollow defined in an output shaft of the reduction gear or the direct-drive motor. Information produced ahead of the output shaft is fed back over signal wires that are drawn through the groove or hollow defined in the output shaft.

3 Claims, 6 Drawing Sheets

NO-WIRING ROBOT

TECHNICAL FIELD

The present invention relates to a robot which does not require electric wires (power transmission wires and signal wires) for interconnecting joint shafts.

BACKGROUND ART

Conventional electrically operated robots, irrespective of whether the vertical multiple-joint type shown in FIG. 9(a) of the accompanying drawings or the horizontal multiple-joint type shown in FIG. 9(b) of the accompanying drawings, require electric wires extending between joints, such as electric wires 91 including electric power wires for energizing motors installed in the respective joints, electric power wires for detectors which detect angular displacements of the motors, and output wires for outputting detected signals. The electric wires used with robots have been problematic in that the length of the electric wires used poses limitations on the range of operation of the robot, and the electric wires are subject to metal fatigue owing to repetitive operation of the robot.

To solve the above problems, Japanese patent publication No. 5-13796 has proposed a device which employs slip rings to transmit electric power between the shafts through surface-to-surface contact for thereby allowing a robot arm to operate in an angular range of 360! or greater and also eliminating electric wires for such electric power transmission.

However, the slip rings are conducive to frictional damage and noise, and may possibly cause an insulation failure which tends to prevent the robot from operating stably if used in machine shops exposed to an oil mist and chips.

DISCLOSURE OF THE INVENTION

It is therefore an object of the present invention to provide a no-wiring robot of the multiple-joint type which transmits electric power and signals between joints thereof in a contactless manner.

An electrodeless unit for transmitting electric power by way of high-frequency electromagnetic induction and a unit for transmitting signals by way of optical transmission or high-frequency electromagnetic induction are installed in either a reduction gear that is coupled to the shaft of a motor for actuating each of the shafts of a robot or a direct-drive motor. Electric power or signal wires are drawn through a groove or hollow defined in an output shaft of the reduction gear or the direct-drive motor. Information produced ahead of the output shaft is fed back over signal wires that are drawn through the groove or hollow defined in the output shaft.

With the above arrangement, a multiple-joint robot capable of rotation about multiple joints is free of mechanical stresses which would otherwise heretofore be posed on electric power and signal wires by movement of the joints, and also free of wire-dependent limitations on a range of joint movement because it does not suffers the crossing of the wires.

According to the present invention, therefore, there are no limitations on the range of movement, and it is possible to realize a multi-turn arm. Furthermore, the problem of an insulation failure which tends to be caused by an oil mist and chips with no-wiring rotatable shaft using slip rings that have heretofore been proposed, and also of noise can be solved for stable transmission of electric power and signals.

In addition, use of separable and connectable units for transmitting electric power and signals makes it possible to achieve a structure by which not only multi-turn about the shafts is possible, but also the shafts can be detached and replaced. Controllers for the shafts are reduced in size and positioned dispersely, and are interconnected by a network for communications and power and a mechanically rigid mechanism, resulting in a robot comprising arm units that can be controlled independently for respective shafts, self-controlled, and replaced.

BEST MODE FOR CARRYING OUT THE INVENTION

Figure 1:
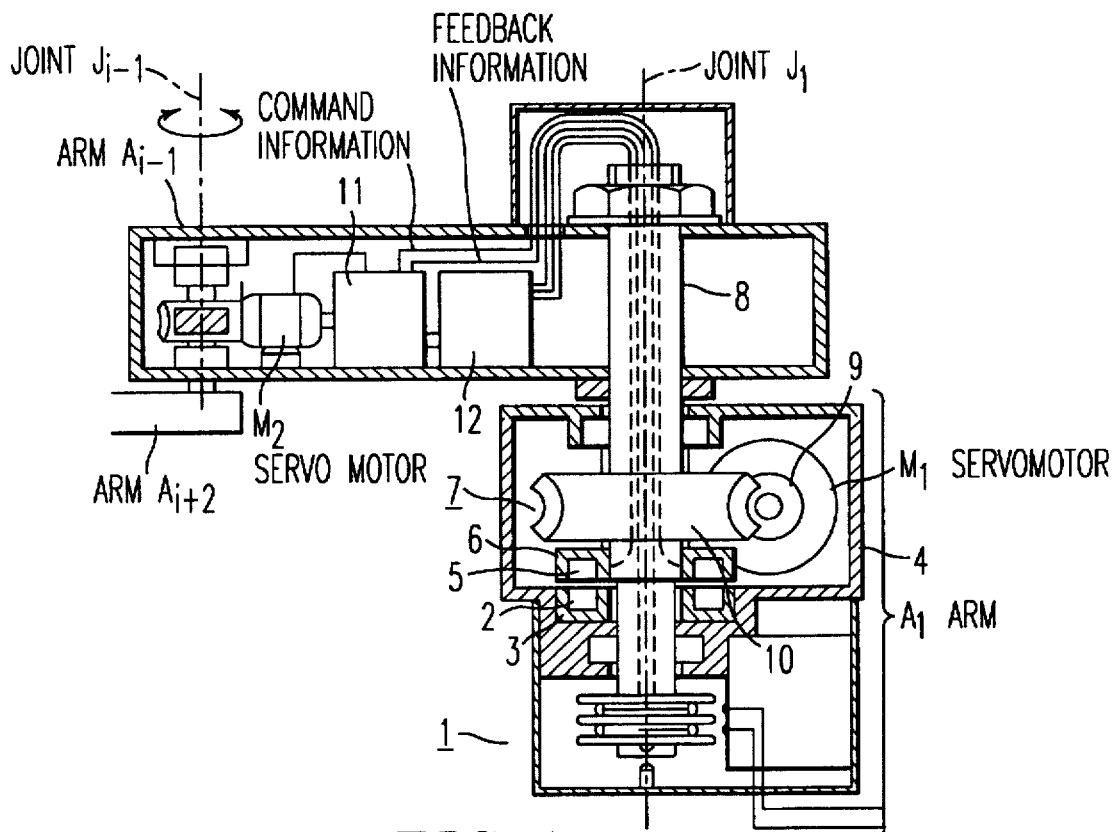
FIG. 1 is a sectional view showing a multiple-joint robot according to an embodiment of the present invention.
Figure 8:
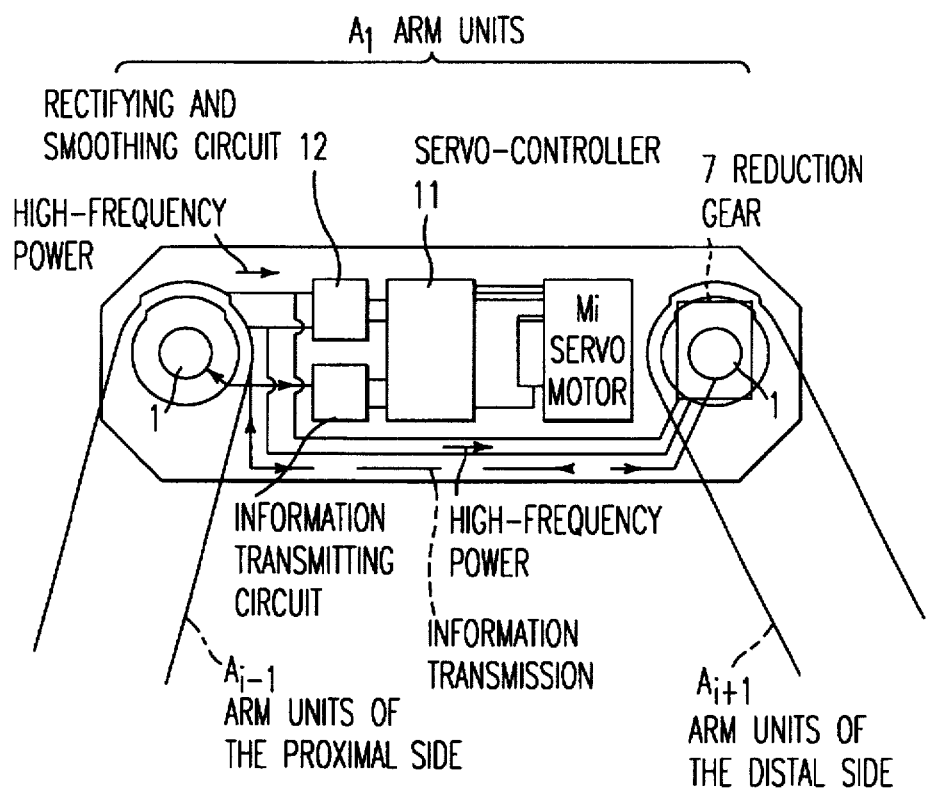
FIG. 8 is a view showing a self-controlled arm according to the other embodiment of the present invention.
Figure 9A:
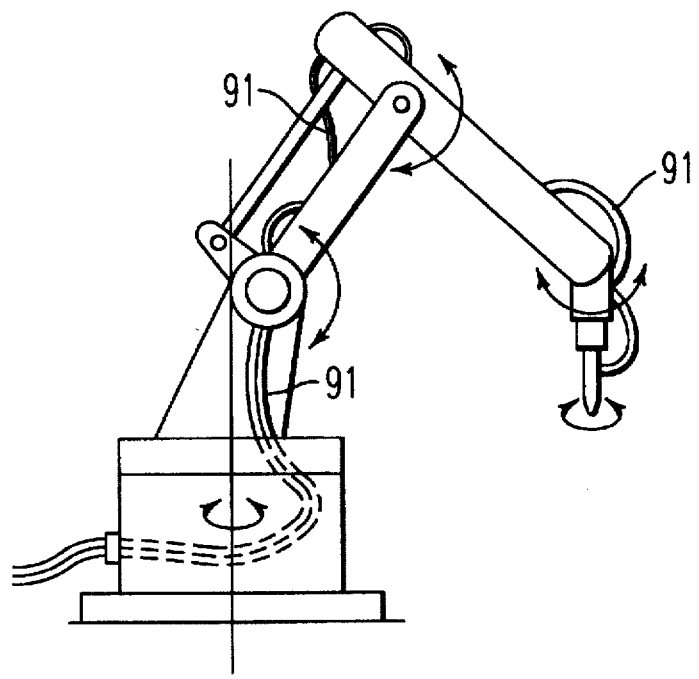
FIG. 9(a) is a view of a conventional robot of the vertical multiple-joint type.
Figure 9B:
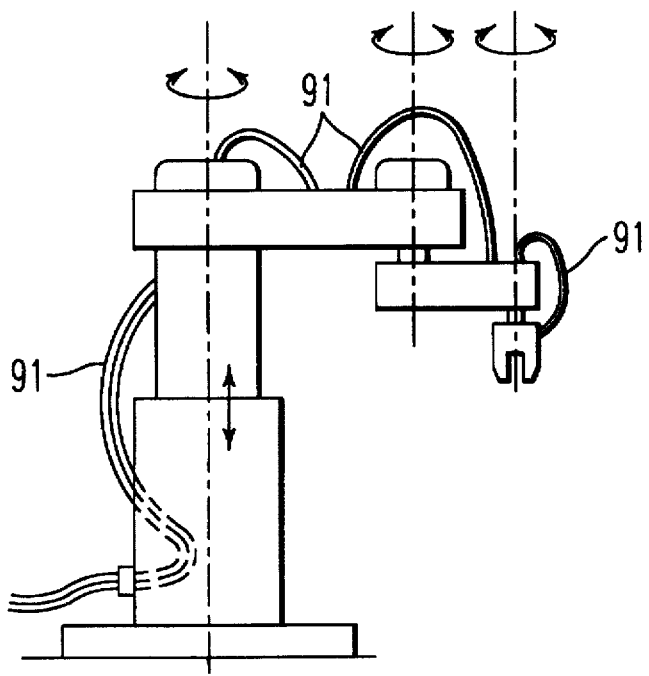
FIG. 9(b) is a view of a conventional robot of the horizontal multiple-joint type.

FIG. 1 is a cross-sectional view showing an embodiment of the present invention. An electric power/information transmitting device 1 is a unit comprising a means for transmitting electric power in a contactless fashion by way of high-frequency electromagnetic induction as proposed in Japanese patent application No. 4-113456 by the present applicant, the means being incorporated in a reduction gear. For the sake of brevity, only one electric power/information transmitting device 1 is shown. Actually, however, as shown in FIG. 8, it is possible to install an electric power/information transmitting device 1 in each of the joints of a multiple-joint robot.

Of the electric power/information transmitting device 1, the means for transmitting electric power in a contactless fashion has a pot-core-type primary high-frequency magnetic body (hereinafter referred to as a "pot core") 3 having a primary winding 2 on a transmission side for high-frequency electromagnetic induction. The pot core 3 is fixedly mounted in a reduction gear case 4. The reduction gear case 4 doubles as an ith arm ($A_i$) (i=1 in FIG. 1). A pot-core-type secondary pot core 6 having a secondary winding 5 is mounted on an output shaft of a reduction gear 7 in confronting relation to the primary high-frequency magnetic body 3 through a very small gap interposed therebetween.

The reduction gear 7 comprises a worm gear 9 mounted on the rotatable shaft of a servomotor $M_1$ fixedly mounted on the reduction gear case 4 and a worm wheel 10 mounted on an output shaft 8 of the reduction gear 7. The output shaft 8 is mechanically secured to an arm $A_{i+1}$ next to the arm $A_i$.

A controller for the servomotor $M_1$ is installed in the arm $A_i$, but is not shown to avoid complex illustration.

Figure 2:
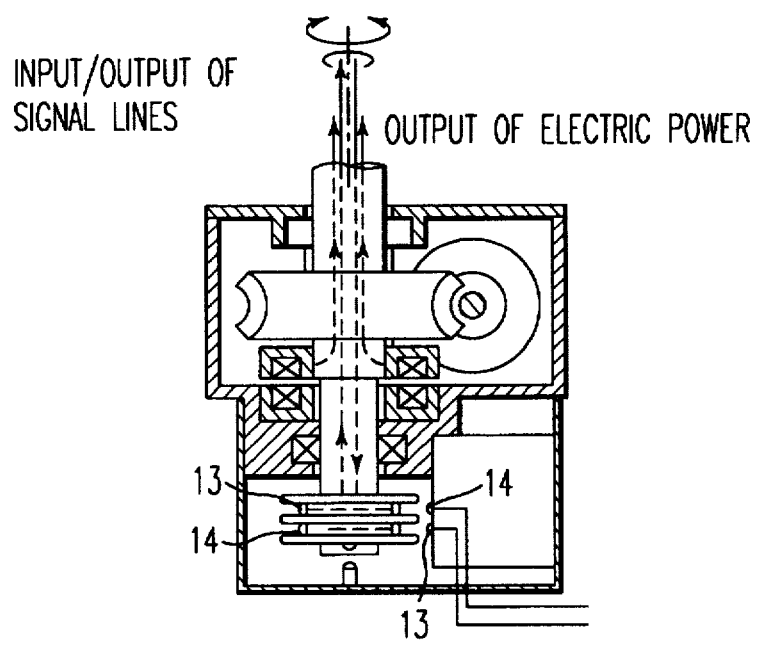
FIG. 2 is a sectional view showing electric power and information output lines through an output shaft of a reduction gear which is part of the embodiment of the present invention.
Figures 3A, 3B:
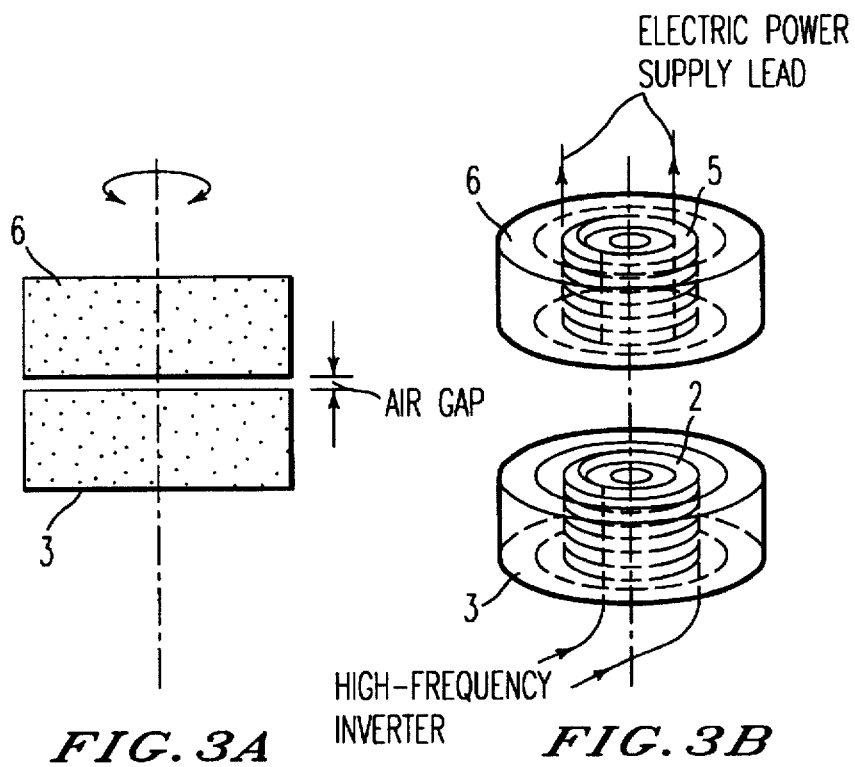
FIG. 3 is a view showing a structure of a pot-core high-frequency transformer which is part of the embodiment of the present invention.

As shown in FIG. 2, the secondary winding has distal ends that can be drawn through a groove or hollow defined in the output shaft of the reduction gear. Even when the arm $A_{i+1}$ rotates, only the relative angle of the confronting pot cores changes, and hence electric power can reliably be transmitted to the arm $A_{i+1}$ without causing a twist in the wires. As shown in FIG. 3, the pot cores have confronting cross-sectional shapes which are of a fully concentric structure to prevent their transformer characteristics from varying even when the relative rotational angles between their primary and secondary sides changes.

A servomotor $M_2$ and a controller 11 therefor are mounted in the arm $A_{i+1}$. A control power supply including a main power supply and a power supply of control-circuits with communication function for this controller is provided by a high-frequency rectifying and smoothing circuit 12 which is mounted in the arm $A_{i+1}$ for converting the high-frequency electric power supplied through the electric power/information transmitting device 1 into a direct current.

Of the electric power/information transmitting device 1, a means for transmitting signals in a contactless fashion may comprise either an optical coupler (i.e., a light-emitting element 13 and a light-receiving element 14) disposed in a region whose atmosphere can be controlled within the electric power/information transmitting device 1, for transmitting signals in a contactless fashion between a fixed side and a rotatable side (output shaft), or a coaxial high-frequency electromagnetic induction device for transmitting signals in the same manner as that for transmitting electric power (described later on).

As with electric power transmission, signal lines can be connected to the arm $A_{i+1}$ through the groove or hollow defined in the output shaft of the reduction gear as shown in FIG. 2. Therefore, as with electric power transmission, data can be transmitted and received regardless of rotation of the joints. Specifically, commands and feedback information can be transmitted in a wireless manner between the arm $A_i$ and the arm $A_{i+1}$, and also between a fixed member and any desired shaft through a plurality of shafts.

The foregoing description is addressed to the actuation of shafts with servomotors combined with speed reducers. For actuating each of the shafts with a direct-drive motor, units for transmitting electric power and information may be arranged as shown in FIG. 4.

Figure 4:
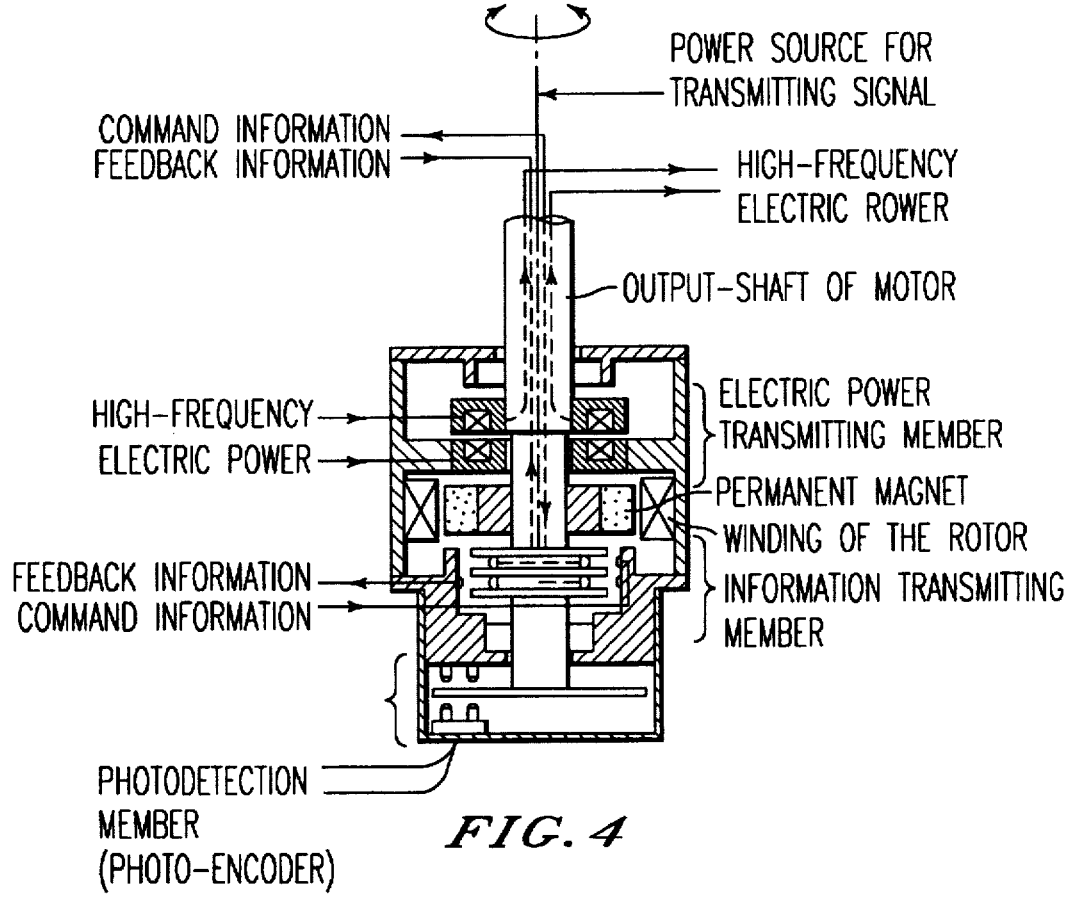
FIG. 4 is a sectional view showing a device for transmitting electric power and information to a direct-drive motor which is part of another embodiment of the present invention.
Figure 5:
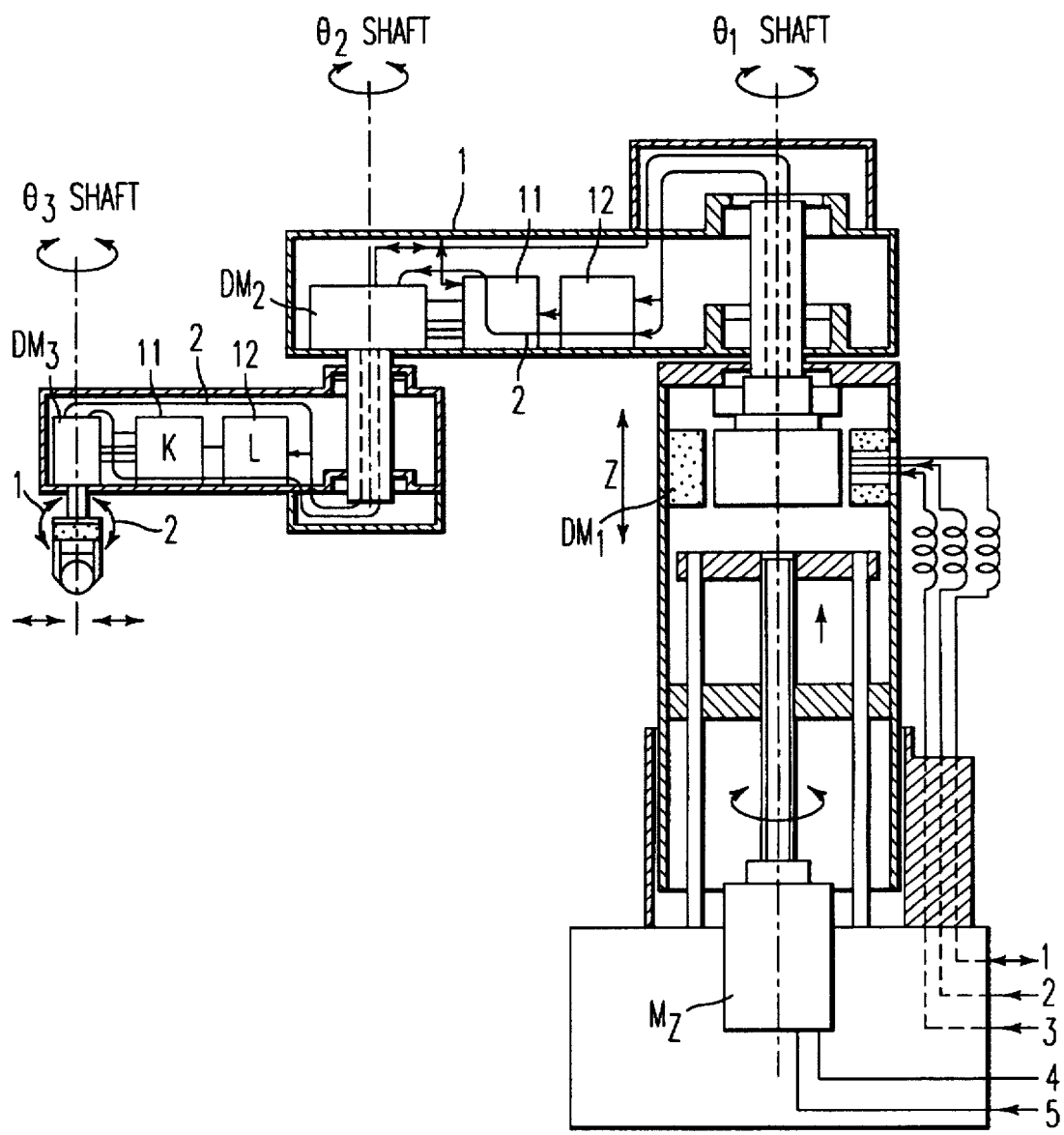
FIG. 5 is a sectional view showing a robot which incorporates the direct-drive motor according to the other embodiment of the present invention.

FIG. 5 shows by way of example a robot which incorporates direct-drive motors as shown in FIG. 4. The robot has an ordinary servomotor $M_2$ for vertically actuating the robot, and direct-drive motors $DM_1$–$DM_3$ for rotating respective arms. These direct-drive motors are positioned in place of the respective pairs of servomotors and reduction gears described above.

The above arrangement offers structural merits provided by the actuation of shafts in a wireless fashion for achieving an increased range of operation and keeping reliability over a long period of time because the units for transmitting electric power and information are housed in the joint actuators (e.g., the reduction gears or the direct-drive motors) of the robot. Along with the features which allow contactless electric power supply through high-frequency electromagnetic coupling and signal transmission to be performed stably even in an atmosphere containing an oil mist and metal particles, this structure may be utilized to construct robots whose arms can physically be detached and replaced or whose shafts may be added or removed depending on the need of jobs to be done.

Figure 6:
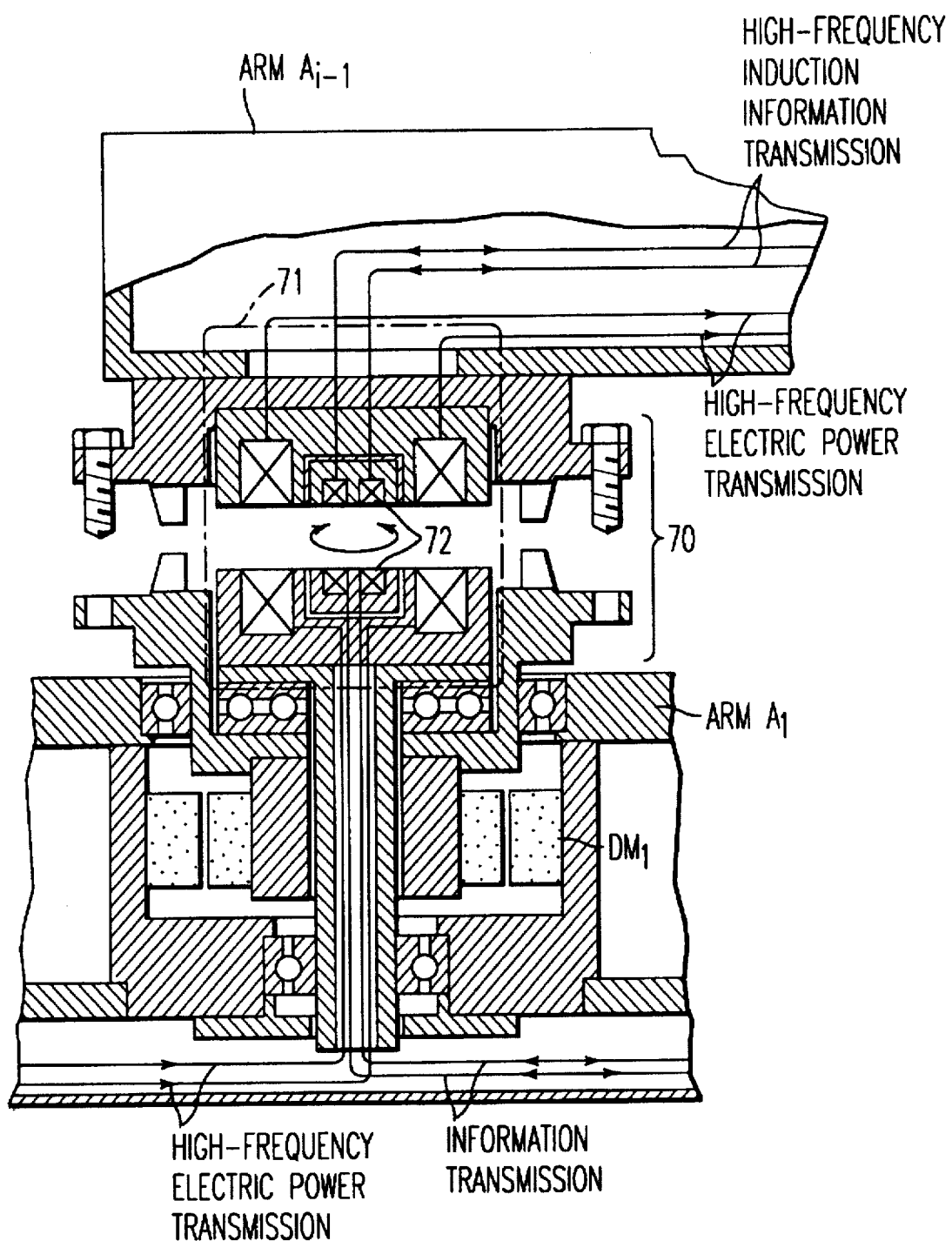
FIG. 6 is a sectional view showing a high-frequency electromagnetic induction device embedded in a mechanical coupling which is part of an embodiment of the present invention.

For example, as shown in FIG. 6, the mechanical rigidity and positional accuracy of a coupling in each joint are provided by a separable and connectable coupling mechanism (e.g., a Carbic coupling or the like). Electric power is transmitted by a high-frequency electromagnetic induction device 71 having a separable and connectable pot-core-type electric power supply device whose primary side (or secondary side) is mounted in a coupling 70, and signals are transmitted by a high-frequency electromagnetic induction device 72 coaxial with the high-frequency electromagnetic induction device 71.

With this arrangement, if the specifications of mechanical rigidity details and electric power and signal transmission interfaces are standardized, then arms units as elements can physically be separated from and coupled to each other. If CPU-controlled servo-drive controllers are installed in the respective arm units, then the shafts can be self-controlled independently of each other. Specifically, an automatic changing process which has heretofore been limited to advanced tool change (ATC) operation can be applied to all the shafts.

If electrical and mechanical interfaces are unified as described above, then there is realized a flexible robot whose shafts as elements can be connected in a different combination to meet a specific requirement.

Naturally, the weight and dimensional limitations posed by the motor driving controllers mounted in the arms cause problems. However, such problems can be solved by reducing the size and weight of a controller installed in each shaft (each arm) with a separable control method disclosed in Japanese patent application No. 4-159614 proposed by the applicant. Recently, semiconductor power switching circuits including pre-stage drivers have been available in greatly integrated scales and reduced sizes, resulting in a greater possibility to combine a motor and a controller in such an integral structure that the cooling fins of a power device and the frame of a servomotor share each other. Such an integrating technology solves thermal and dimensional problems, making it possible to achieve a compact arm structure.

Figure 7:
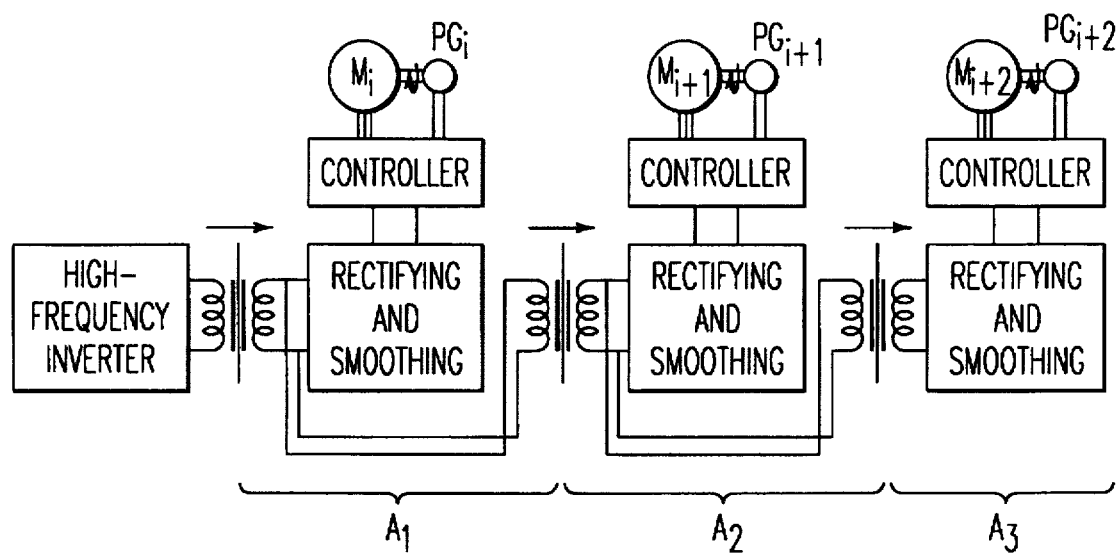
FIG. 7 is a block diagram showing an overall conceptual arrangement of a plurality of connected self-controlled arms according to another embodiment of the present invention.

It is therefore possible to realize a structure as shown in FIG. 8 in which motors (or direct-drive motors) (with reduction gears) are installed in the respective arms of a multiple-joint robot, and commands to controllers and sequence and feedback signals are transmitted and received by serial-communication ICs of the controllers. With such a structure, electric power is transmitted by a repetitive series connection of high-frequency induction transformers as shown in FIG. 7.

Industrial Applicability

The present invention is applicable to a multiple-joint robot.

We claim:

1. A no-wiring robot comprising:
   at least one joint housing a motor for actuating its own joint or another joint either through a reduction gear or directly;
   electric power transmitting means including a fixed core having a primary winding around a proximal portion of a rotatable shaft by which a joint and a base or joints are rotatably supported, and a rotatable core having a secondary winding around a distal portion of the rotatable shaft, the fixed core confronting the rotatable core without contact, for transmitting electric power from the proximal portion to the distal portion without contact by way of high-frequency electromagnetic induction;

signal transmitting means including light-emitting and -receiving elements disposed respectively around the proximal and distal portions of said rotatable shaft, the light-emitting and -receiving elements confronting each other without contact, for transmitting optical control and detected signals from the proximal portion to the distal portion and vice versa without contact; and means for converting high-frequency electric power transmitted from said electric power transmitting means for energizing said motor, and means for energizing said motor based on the control or detected signal transmitted from the proximal or distal portion, said means being disposed in each shaft which houses said motor.

2. A no-wiring robot comprising:

at least one joint housing a motor for actuating its own joint or another joint either through a reduction gear or directly;

electric power transmitting means including a fixed core having a primary winding around a proximal portion of a rotatable shaft by which a joint and a base or joints are rotatably supported, and a rotatable core having a secondary winding around a distal portion of the rotatable shaft, the fixed core confronting the rotatable core without contact, for transmitting electric power from the proximal portion to the distal portion without contact by way of high-frequency electromagnetic induction;

signal transmitting means coaxial with the cores of said electric power transmitting means, for transmitting control and detected signals from the proximal portion to the distal portion and vice versa without contact by way of high-frequency electromagnetic induction; and means for converting high-frequency electric power transmitted from said electric power transmitting means for energizing said motor, and means for energizing said motor based on the control or detected signal transmitted from the proximal or distal portion, said means being disposed in each shaft which houses said motor.

3. A no-wiring robot according to claim 1, wherein the rotatable core having the core winding, the means for converting high-frequency electric power received through the rotatable core, the means for energizing said motor based on the control or detected signal transmitted from the proximal or distal portion, and a joint mechanism having a mechanism for actuating the other joint or its own joint with said motor, are detachable.

* * * * *